3,060,167
PROCESS FOR THE MANUFACTURE OF NEW METALLIZABLE 4-HYDROXY-5-CARBOXY-PHENYL-2:2'-DIHYDROXY-AZO-DYESTUFFS

Franz Graf, Basel, Switzerland, assignor to Durand & Huguenin A.G., Basel, Switzerland, a Swiss Company
No Drawing. Filed Jan. 15, 1959, Ser. No. 786,930
Claims priority, application Switzerland Jan. 17, 1958
8 Claims. (Cl. 260—173)

This invention provides a process for the manufacture of new metallizable 4-hydroxy-5-carboxyphenyl-2:2'-dihydroxy-azo-dyestuffs, which contain at least one atomic grouping of the formula

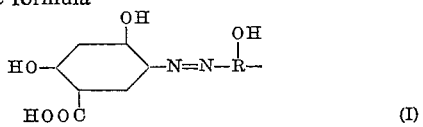
(I)

in which R represents the residue of a coupling component in which the hydroxyl group is in a position vicinal to the carbon atom capable of coupling.

The aforesaid dyestuffs are obtained by a first process for the manufacture of 4-hydroxy-5-carboxyphenyl-2:2'-dihydroxy-azo-dyestuffs in which a 1-amino-2-arylsulphonyloxy-4-hydroxybenzene-5-carboxylic acid is diazotized and the diazo-compound so obtained is coupled with a coupling component which contains a hydroxyl group in a position vicinal to the carbon atom capable of coupling. From the resulting arylsulphonyl ester of the 4-hydroxy-5-carboxyphenyl-2:2'-dihydroxy-azo-dyestuff the arylsulphonyl residue is then split off by hydrolysis in an alkaline medium. The dyestuffs so obtained, which contain at least one atomic grouping of the Formula I above, can be converted into complex metal compounds, and are especially useful for chrome printing on cotton. The dyeings and prints are distinguished by their very good fastness to light and properties of wet fastness.

However, the above process has various disadvantages, especially the tendency for the arylsulphonyl residue to split off during the manufacture of the arylsulphonyl ester dyestuff in an alkaline medium.

Furthermore, dyestuffs which contain no sulphonic acid groups are generally so sparingly soluble in water that they cannot be used for dyeing or printing by the usual methods.

A further disadvantage of the aforesaid arylsulphonyl ester dyestuffs is that it is practically impossible to metallize them on the fibre, because the alkaline hydrolysis of the arylsulphonyl ester when fixed with chromium on the fibre proceeds too slowly and damage may thereby be caused to the fibre.

The present invention provides a process for the manufacture, in a simple manner and in very good yield, of metallizable 4-hydroxy-5-carboxyphenyl-2:2'-dihydroxy-azo-dyestuffs which contain at least one atomic grouping of the formula

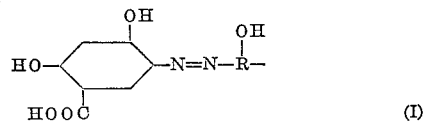
(I)

in which R represents the residue of a coupling component which contains the hydroxyl group in a position vicinal to the carbon atom capable of coupling, wherein a sulphuric acid mono-(5-hydroxy-4-carboxy-2-aminophenyl) ester of the formula

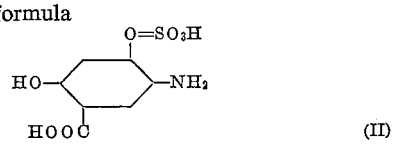
(II)

is diazotized, the resulting diazo-compound is coupled with a coupling component which contains a hydroxyl group in ortho-position to the carbon atom capable of coupling, and the resulting 4-hydroxy-5-carboxyphenyl-2-monosulphuric acid ester-2'-hydroxy-azo-dyestuff, which contains at least one atomic grouping of the formula

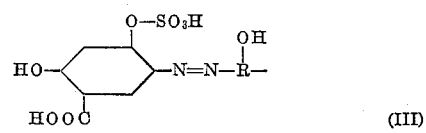
(III)

in which R has the meaning given above, is hydrolyzed in an acid to neutral medium in substance or on the fibre to split off the sulphuric acid ester group and yield a 4-hydroxy-5-carboxy-phenyl-2:2'-dihydroxy-azo-dyestuff containing at least one atomic grouping of the Formula I.

The process of this invention is therefore characterized by the use as starting material of the sulphuric acid mono-(5-hydroxy-4-carboxy-2-aminophenyl) ester of the above Formula II.

This ester is new and can be obtained in very good yield, for example, as follows:

(a) *Sulphuric acid mono-(3-hydroxy-4-carboxyphenyl) ester*

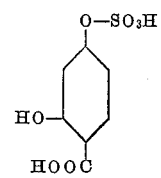

Dry 2:4-dihydroxybenzoic acid is introduced with the exclusion of moisture into a mixture of pyridine and chlorosulphonic acid. The esterification is completed in the course of 5–6 hours at a moderately raised temperature, advantageously 50–70° C. The reaction mixture is poured on to an excess of sodium carbonate, water is cautiously added, and the pyridine is expelled by introducing steam. There is obtained a clear alkaline solution of the sulphuric acid mono-(3-hydroxy-4-carboxyphenyl) ester.

(b) *Sulphuric Acid Mono-[5-Hydroxy-4-Carboxy-2-(4'-Chlorophenylazo)-Phenyl-(1)] Ester*

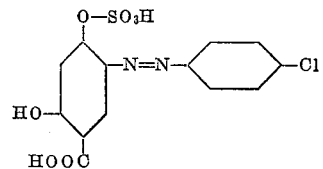

4-chloraniline is diazotized in the usual manner, and coupled in the presence of an excess of sodium carbonate with the sulphuric acid mono-(3-hydroxy-4-carboxyphenyl) ester obtained as described under (a) above. Towards the end of the coupling reaction the mixture is heated to 50–60° C., whereupon the partially precipitated ester dyestuff dissolves. The mixture is filtered to remove impurities and the ester dyestuff is precipitated by the addition of sodium chloride.

The dried disodium salt of the yellow ester dyestuff has the following analytical data (calculated as the anhydrous and salt-free product).

$C_{13}H_7O_7N_2ClSNa_2$: Calculated, N, 6.73%; Cl, 8.53%; S, 7.69%; (mol 416.5). Found: N, 6.76%; Cl, 8.47%; S, 7.76%.

(c) *Sulphuric Acid Mono-(5-Hydroxy-4-Carboxy-2-Aminophenyl) Ester*

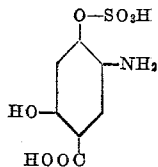

The ester dyestuff obtained as described under (b) above is treated, for example, in the presence of an excess of caustic soda solution with sodium hydrosulphite at a temperature of 75–95° C. The solution, which is decolorized by the reduction, is freed from 4-chloraniline by steam distillation and then cooled to 0° C. The decomposition products of the sodium hydrosulphite which crystallize out are removed, and hydrochloric acid is added to the clear solution at a temperature of about −5° C., whereby the sulphuric acid mono-(5-hydroxy-4-carboxy-2-aminophenyl) ester precipitates as the internal salt. The precipitate is filtered off, washed neutral and dried, whereby there is obtained in excellent yield a pale grey powder which has the following analytical data (calculated as the anhydrous and salt-free product).

$C_7H_7O_7NS$ (249): Calculated, N, 5.63%; S, 12.85%. Found: N, 5.59%; S, 12.86%.

In the process of the invention the diazotization of the sulphuric acid mono-(5-hydroxy-4-carboxy-2-aminophenyl) ester is advantageously carried out at a temperature below 0° C., in order to prevent premature hydrolysis of the sulphuric acid ester and any nitrozation. Preferably the so-called indirect method of diazotization is used by allowing a solution of the disodium salt of the sulphuric acid mono-(5-hydroxy-4-carboxy-2-aminophenyl) ester and sodium nitrite to run into a mixture of ice, sodium chloride and hydrochloric acid in such manner that the temperature does not rise above −5° C. The diazo-compound precipitates in the form of the internal salt and may be filtered off and washed neutral with ice water. The diazo-compound so obtained is stable in a neutral or alkaline medium.

The coupling of the diazotized sulphuric acid mono-(5-hydroxy-4-carboxy-2-aminophenyl) ester with the coupling components containing in a position vicinal to the carbon atom capable of coupling a hydroxyl group or an enolizable keto group, may be carried out by the usual methods in the presence of an alkali. If desired, the coupling reaction may be accelerated by the addition of a small proportion of pyridine or by heating.

As coupling components there may be used the customary azo-dyestuff coupling components which contain in a position vicinal to the carbon atom capable of coupling a hydroxyl group or an enolizable keto group.

(A) Among coupling components that yield monoazo-dyestuffs there may be mentioned, for example 1:3-dihydroxybenzene,
2:4-dihydroxybenzoic acid,
acetoacetylaminobenzene,
4-acetoacetylamino-1-chlorobenzene,
3-acetoacetylaminobenzene-sulphonic acid,
5-acetoacetylamino-2-hydroxybenzoic acid,
1-(3'-carboxy-4'-hydroxyphenyl)-3-methyl-5-pyrazolone,
2-hydroxynaphthalene,
2-hydroxynaphthalene-3:6-disulphonic acid,
1-hydroxy-8-aminonaphthalene-3-sulphonic acid,
1-hydroxy-8-aminonaphthalene-3:6- and -4:5-disulphonic acid and acylation products thereof.

(B) If desired, 2 molecular proportions of the diazotized sulphuric acid mono-(5-hydroxy-4-carboxy-2-aminophenyl) ester may be coupled with 1 molecular proportion of a component capable of coupling twice, which contains in a position vicinal to each carbon atom capable of coupling a hydroxyl group or a group convertible into an enolizable group. As examples of such components there may be mentioned:

1:3-dihydroxybenzene,
1:8-dihydroxynaphthalene-3:6-disulphonic acid,
1-hydroxy-8-acetoacetylaminonaphthalene-3:6-disulphonic acid,
5:5'-dihydroxynaphthyl-(2:2')-amine disulphonic acid-(7:7').

(C) As coupling components which contain in a position vicinal to the carbon atom capable of coupling a hydroxyl group or a group convertible into an enolizable group, and also contain an azo-linkage, there are to be understood azo-dyestuffs obtainable by diazotizing an aromatic amino- or aminoazo-compound, and coupling the diazo compound in an acid medium with an aminonaphthol sulphonic acid, for example, the product obtained by coupling diazotized 4-nitraniline in an acid medium with 1-amino-8-naphthol-3:6-disulphonic acid, or products obtained by coupling with one molecular proportion of a component capable of coupling twice such, for example, as 4':2'-dihydroxy-1:1'-azobenzene-4-sulphonic acid.

The new sulphuric acid monoesters of 4-hydroxy-5-carboxyphenyl-2:2'-dihydroxy-azo-dyestuffs which contain at least one atomic grouping of Formula III can be isolated by known methods and, if desired, purified.

The new dyestuffs that contain at least one atomic grouping of the Formula III contain in one and the same molecule a group capable of forming complexes and also a system convertible into a group capable of forming complexes, since the atomic grouping of the Formula III can be converted by treatment with an acid into an atomic grouping of the Formula I accompanied by the splitting of the sulphuric acid ester (ester splitting).

The dyestuffs can be used for dyeing in any one of the following ways with ester splitting on the fibre:

(a) Dyeing, ester splitting on the fibre, and metallization, or
(b) Dyeing, metallization, ester splitting on the fibre and further metallization, or
(c) Metallization, dyeing, ester splitting on the fibre and further metallization, or with ester splitting in substance:

(d) Ester splitting in substance, dyeing and metallization, or
(e) Ester splitting in substance, metallization, dyeing and further metallization.

Depending on their constitution, the dyestuffs containing at least one atomic grouping of the Formula III produce various tints on animal, vegetable and synthetic fibres, and some of them are also suitable for dyeing anodically oxidized aluminium. In general, the dyeings are strong and brilliant, but have only moderately good fastness properties. In chrome printing, in after-chroming on the fibre and in dyeing pre-chromed fibres, while retaining the ester grouping in the Formula III, much better properties of wet fastness and in some cases also a better fastness to light than has hitherto been possible are obtained owing to complex formation at the ortho-hydroxy-carboxyphenyl group.

The same result is obtained by subjecting the ester dyestuffs to a short treatment at a moderately raised temperature with an agent yielding chromium, such as chromium acetate, whereby the chromium enters the ortho-hydroxy-carboxyphenyl group and the ester grouping in the Formula III. Complexes of this type are distinguished by their very good solubility and good capacity for being fixed.

By treating with an acid a dyestuff that contains at least one atomic grouping of the Formula III, the sulphuric acid ester is split and a dyestuff is formed that contains at least one atomic grouping of the Formula I. With a strong acid, such as hydrochloric acid or sulphuric acid, the ester is split even at room temperature, whereas with a weak acid, such as acetic acid, a higher temperature is required to bring about ester splitting at an appreciable speed.

When the ester splitting is carried out on the fibre, it is of advantage to subject to such splitting a dyeing that has been fixed with chromium, in order to prevent bleeding of the dyestuff. Subsequent treatment with an agent yielding metal produces dyeings distinguished by their very good properties of wet fastness and fastness to light.

When the ester splitting is carried out in substance, 4-hydroxy - 5 - carboxyphenyl - 2:2'-dihydroxy-azo-dyestuffs are formed that contain at least one atomic grouping of the Formula I. Dyeings produced with these dyestuffs can be after-treated by the usual methods with agents yielding metal, more especially with compounds of copper and chromium, whereby the general properties of fastness are considerably improved.

Alternatively, the dyestuffs that contain at least one atomic grouping of the Formula I may be converted into metal complexes by treating them in substance by known methods with an agent yielding metal. The metalliferous dyestuffs so obtained, when they contain sulphonic acid groups, are suitable for dyeing animal, vegetable and synthetic fibres, and also for dyeing anodically oxidized aluminium. Dyeings produced with dyestuffs, which contain metal bound in complex union with the ortho-dihydroxyazo-group and in which the ortho-hydroxy-carboxyphenyl group as yet contains no heavy metal in complex union, can be after-treated with an agent yielding a metal, preferably with a chromium compound, whereby the properties of wet fastness are considerably improved. The metalliferous dyestuffs containing sulphonic acid groups are especially useful in chrome printing. In printing on cotton they reduce tints having very good properties of wet fastness and fastness to light, and some of them are remarkably pure.

An especially advantageous form of the process consists in subjecting a dyestuff that contains at least one atomic grouping of the Formula III in substance or preferably on the fibre to ester splitting and metallization in the same operation. This is achieved by treating the dyestuff in a neutral to weakly acid medium at a temperature of 40° C. to 95° C. with an agent yielding metal. The agent yielding metal may be a simple metal salt, such as a sulphate, chloride or acetate, or a compound in which the metal is bound in complex union, such as an aromatic or aliphatic hydroxy-carboxylic acid, dicarboxylic acid or amino-carboxylic acid. Especially good results are obtained by fixing on the fibre with chromium a dyestuff that contains at least one atomic grouping of the Formula III, and after-treating the dyeing in a neutral to weakly acid medium at a raised temperature with a copper salt.

As compared with the above-described first process, the process of this invention has, inter alia, the following advantages:

The sulphuric acid mono-(5-hydroxy-4-carboxy-2-aminophenyl) ester and the ester dyestuffs made therefrom are stable in an alkaline medium even at raised temperatures. The stability of alkalies considerably facilitates the manufacture of the dyestuffs and leads in some cases also to better tinctorial yields.

Further advantages of the process of this invention are the good solubility of the ester dyestuffs formed as intermediates and the fact that they are easy to metallize on the fibre.

By coupling sulphuric acid mono-(5-hydroxy-4-carboxy-2-aminophenyl) ester with a component that is free from sulphonic acid groups, such as 1:3-dihydroxybenzene, a dyestuff is obtained that is readily soluble in water and can be fixed on the fibre in chrome printing without difficulty. By after-treating the dyeing for a few minutes with copper sulphate or other copper salt, the sulphuric acid ester is split and the ortho-ortho'-dihydroxyazo-copper complex is also formed, and prints are obtained that are fast to washing and possess an excellent fastness to light.

The following examples illustrate the invention, the parts being by weight unless otherwise stated, and the relationship of parts by weight to parts by volume being the same as that of the kilogram to the litre:

EXAMPLE 1

24.9 parts of sulphuric acid mono-(5-hydroxy-4-carboxy-2-aminophenyl) ester (molecular weight: 249) are dissolved in 100 parts of cold water with 20 parts by volume of aqueous sodium hydroxide solution of 30% strength, and the solution is mixed with 25 parts by volume of a 4 N-solution of sodium nitrite. The clear solution is slowly stirred into a mixture of 400 parts of ice, 100 parts by volume of saturated sodium chloride solution and 60 parts by volume of hydrochloric acid of 30% strength in a manner such that the temperature does not rise above −5° C. The diazotization is complete after 10–20 minutes. The precipitated diazo-compound is isolated, and introduced into a previously prepared solution in 200 parts of water of 60 parts by volume of aqueous sodium hydroxide solution of 30% strength, 10 parts of pyridine, 100 parts of ice and 35 parts of the disodium salt of 2-hydroxy-naphthalene-3:6-disulphonic acid (molecular weight: 348). The mixture is stirred until the coupling is complete, the coupling solution is adjusted to a pH value of 9 with acetic acid, and the whole is heated to 40–50° C. The dyestuff is precipitated with 300 parts of sodium chloride, filtered off and dried in vacuo at 60–80° C.

In the form of its free acid the ester dyestuff obtained in this manner corresponds to the structural formula

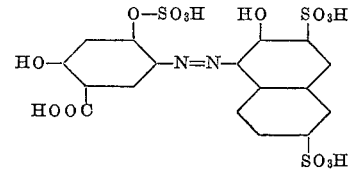

and forms a reddish brown powder which dissolves in water and concentrated sulphuric acid with red coloration. In chrome printing on cotton it yields a bluish violet dyeing; when after-treated with copper acetate+acetic acid at 90° C., accompanied by cleavage of the sulphuric acid ester and simultaneous formation of the ortho-ortho'-dihydroxyazo-copper complex, a red-violet tint is obtained which is fast to washing and possesses excellent fastness to light.

The identical result is achieved by after-treatment with copper sulphate at 60–70° C.

EXAMPLE 2

50 parts of the ester dyestuff prepared as described in Example 1 are dissolved in 750 parts of water at room temperature and mixed with 60 parts by volume of hydrochloric acid of 30% strength. A clear red-orange solution is obtained which gives a distinct mineral acid reaction. It is left to itself for 48 hours at room temperature after which the splitting of the sulphuric acid ester is complete, and 75 parts of calcined sodium carbonate are then cautiously added. The solution, which now has an intensely blue-violet coloration, is heated to 40–50° C., and the dyestuff is precipitated with sodium chloride. The isolated and dried dyestuff corresponds in the form of its free acid to the structural formula

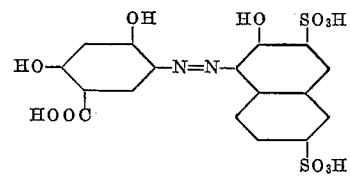

and forms a violetish brown powder; its solution in water is reddish blue and in concentrated sulphuric acid bluish red. In chrome printing on cotton it produces a violent tint which on after-treatment with copper acetate —accompanied by formation of the ortho-ortho'-dihydroxyazo-copper complex—produces a reddish violet tint which is very fast to light, on wool a violet tint, and on anodically oxidized aluminium a bluish red.

EXAMPLE 3

50 parts of the ortho-ortho'-dihydroxyazo dyestuff obtained as described in Example 2 are dissolved in 500 parts of water at 90–95° C. 100 parts of a chromium acetate solution containing 5.5 parts of chromium are stirred in dropwise. The whole is stirred to complete the formation of the ortho-ortho'-dihydroxyazo-chromium complex, and the very readily metallizable dyestuff is isolated by evaporating the reaction mixture to dryness in vacuo.

The resulting chromiferous monoazo dyestuff forms a dark violetish powder which dissolves in water and in concentrated sulphuric acid with violet coloration. In chrome printing on cotton it gives a fast blue-violet tint.

When the chromium solution is replaced by an equivalent amount of cobalt solution, a grey violet tint is obtained in chrome printing cotton.

When the chromium solution is replaced by an equivalent amount of copper acetate or copper tetramine, a dyestuff is formed which produces on cotton in chrome printing a pure red violet of very good fastness to light.

EXAMPLE 4

When in Example 1, 2-hydroxynaphthalene-3:6-disulphonic acid is replaced by an equivalent amount of 1-hydroxynaphthalene-4-sulphonic acid, a sulphuric acid monoester dyestuff of similar properties results.

When the sulphuric acid ester is split as described in Example 2, the corresponding ortho-ortho'-dihydroxyazo dyestuff is formed; it is metallized as described in Example 3, to yield the following metalliferous azo dyestuffs.

| Metal bound in complex union to the ortho:ortho'-dihydroxyazo group: | Tint produced in chrome printing on cotton |
| --- | --- |
| Chromium | Red-violet. |
| Cobalt | Claret. |
| Copper | Claret. |

The dyeings are distinguished by good fastness to light and washing.

EXAMPLE 5

24.9 parts of sulphuric acid mono-(5-hydroxy-4-carboxy-2-aminophenyl) ester (molecular weight: 249) are diazotized as described in Example 1. The diazo suspension is added to a prepared solution consisting of 16 parts of 2:4-dihydroxybenzoic acid (molecular weight 154), 100 parts by volume of aqueous sodium hydroxide solution of 30% strength, 20 parts of pyridine, 50 parts of water and 50 parts of ice. The whole is stirred at room temperature to complete the coupling; the coupling solution is then adjusted to pH=8.5 with 25 parts of acetic acid of 80% strength and heated to 40–50° C. The dyestuff is salted out with 300 parts of sodium chloride, filtered off and dried in vacuo at 60–80° C.

In the form of its free acid the readily soluble dyestuff corresponds to the structural formula

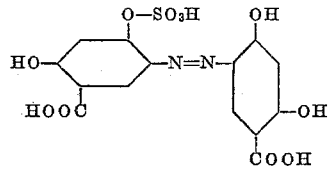

and forms a dark brown powder which dissolves in water with yellow-brown coloration and in concentrated sulphuric acid with brown coloration. In chrome printing on cotton it produces a deep brown tint. On after-treatment with copper sulphate for 5–10 minutes at 60–70° C.—which is accompanied by cleavage of the sulphuric acid ester and by simultaneous formation of the ortho: ortho'-dihydroxyazo-copper complex—a violetish brown tint results which has excellent fastness properties to washing and light.

An identical result is obtained by after-treating with copper acetate for 5–10 minutes in an acetic acid solution at 90–95° C.

EXAMPLE 6

24.9 parts of sulphuric acid mono-(5-hydroxy-4-carboxy-2-aminophenyl) ester (molecular weight 249) are diazotized as described in Example 1. The diazo suspension is added to a solution consisting of 11 parts of 1:3-dihydroxybenzene (molecular weight 110), 20 parts of pyridine, 85 parts by volume of aqueous sodium hydroxide solution of 30% strength and 100 parts of water. On completion of the coupling the dyestuff is precipitated with sodium chloride at pH=8.5, isolated and dried. A reddish brown powder is obtained which dissolves in water with yellow coloration and in concentrated sulphuric acid with yellow-brown coloration. In chrome printing on cotton it produces a strong reddish brown tint which, on after-treatment with copper sulphate—accompanied by splitting of the sulphuric acid ester and by simultaneous formation of the ortho:ortho'-dihydroxyazo-copper complex—produces a deep brown tint which is fast to washing and has excellent fastness to light.

EXAMPLE 7

24.9 parts of sulphuric acid mono-(5-hydroxy-4-carboxy-2-aminophenyl) ester (molecular weight 249) are diazotized as described in Example 1. The diazo suspension is added to a solution consisting of 18 parts of acetoacetylaminobenzene (molecular weight 177), 200 parts of water, 50 parts of pyridine and 120 parts of calcined sodium carbonate. Towards the end of the coupling reaction the whole is raised to 40–50° C., and the dyestuff is precipitated by adding 180 parts of sodium chloride. After isolating and drying it, a yellow powder is obtained which dissolves in water and in concentrated sulphuric acid with yellow coloration. In chrome printing on cotton it produces a brilliant yellow tint of good fastness to washing which, on being after-coppered with copper sulphate—accompanied by cleavage of the sulphuric acid ester and by simultaneous formation of the ortho:ortho' - dihydroxyazo - copper complex—yields a brownish yellow tint of very good fastness to light.

Dyestuffs having similar properties result when 1-chloro - 4 - acetoacetylaminobenzene or 3 - acetoacetylaminobenzene-1-sulphonic acid is used as coupling component.

EXAMPLE 8

When the coupling is performed according to Example 7 with 24 parts of 5-acetoacetylamino-2-hydroxybenzoic acid (molecular weight 237), a yellow-brown powder is obtained which dissolves in water and in concentrated sulphuric acid with yellow coloration. In the form of its free acid the dyestuff corresponds to the following structural formula

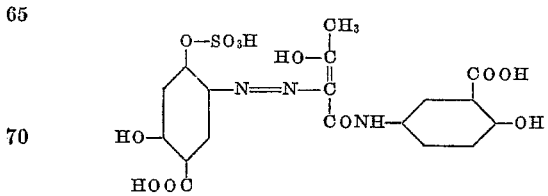

49.7 parts of this dyestuff (molecular weight 497) are dissolved in 500 parts of water. The clear yellow solution is mixed with 100 parts of a chromium acetate solution containing 15 parts of chromium, and the mixture is heated for 5 minutes at 80–85° C. Without cleavage of the sulphuric acid ester, the very readily soluble dichromium complex of the dyestuff is obtained in which chromium is bound to the two ortho-hydroxy-carboxy groups.

This dark-brown dyestuff solution dyes natural silk, wool, nylon, cotton and anodically oxidized aluminium clear, reddish yellow tints.

After-treatment of the above dyeings with copper sulphate at 60–70° C.—accompanied by cleavage of the sulphuric acid ester and by simultaneous formation of the ortho:ortho′-dihydroxyazo-copper complex—produces yellow-brown tints, some of which have very good fastness to light.

EXAMPLE 9

24.9 parts of sulphuric acid mono-(5-hydroxy-4-carboxy-2-aminophenyl) ester (molecular weight 249) are diazotized as described in Example 1 and coupled with 23.5 parts of 1-(4′-hydroxy-3′-carboxyphenyl)-3-methyl-5-pyrazolone (molecular weight 234). After isolation and drying, the dyestuff is obtained in the form of an orange-coloured powder which dissolves in water with orange coloration and in concentrated sulphuric acid with red-orange coloration.

In chrome printing on cotton it produces a clear orange tint which is fast to washing and has good fastness to light; when after-coppered—accompanied by splitting of the sulphuric acid and by simultaneous formation of the ortho:ortho′-dihydroxyazo-copper complex—it yields a brownish orange tint of outstanding fastness to light.

Further valuable metalliferous monoazo dyestuffs can be prepared according to Examples 1 to 8, some of which are shown in the following table:

| Example No. | Component | Tint of coppered dyeing in chrome printing on cotton |
|---|---|---|
| 10 | 2-hydroxynaphthalene | claret. |
| 11 | 1 - amino -8- hydroxynaphthalene-6-sulphonic acid. | violet. |
| 12 | 1 - amino - 8 - hydroxynaphthalene - 4:6-disulphonic acid. | blue-violet. |
| 13 | 1 - acetylamino -8- hydroxynaphthalene-3:6-disulphonic acid. | Do. |
| 14 | 1 - benzoylamino - 8 - hydroxynaphthalene-3:6-disulphonic acid. | Do. |
| 15 | 1 - (4′- hydroxy -3′- carboxybenzene-sulphonylamino) - 8 - hydroxynaphthalene-3: 6-disulphonic acid. | violet. |
| 16 | 4 - (2′- hydroxynaphthalene - 6′- sulphonyloxy) - 2 - hydroxybenzene-1-carboxylic acid. | claret. |
| 17 | 2 - hydroxynaphthoic acid - (3) - anilide. | Do. |

EXAMPLE 18

24.9 parts of sulphuric acid mono-(5-hydroxy-4-carboxy-2-aminophenyl) ester (molecular weight 249) are diazotized as described in Example 1. The diazo suspension is added to a solution consisting of 5.5 parts of 1:3-dihydroxybenzene (molecular weight 110), 72 parts by volume of aqueous sodium hydroxide solution of 30% strength, 20 parts of pyridine and 150 parts of ice water. The mixture is stirred at room temperature to complete the coupling, the dyestuff solution is adjusted to pH=8.5 by adding acetic acid, heated to 40–50° C., and the dyestuff is precipitated with sodium chloride. The dyestuff corresponds in the form of its free acid to the structural formula

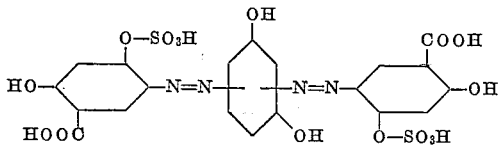

It is filtered off and dried in vacuo at 60 to 70° C. The readily soluble dyestuff forms a greyish black powder which dissolves in water with brown coloration and in concentrated sulphuric acid with brownish violet coloration.

In chrome printing this dyestuff produces on cotton a dark brown tint. When after-coppered with copper sulphate at 50–70° C., or with copper acetate at 90–100° C.—accompanied by splitting of the sulphuric acid ester and by simultaneous formation of the ortho:ortho′-dihydroxyazo-copper complexes which can also be defined as the di-ortho:ortho′-dihydroxyazo-copper complex compound—a deep black tint is obtained which has excellent fastness to light and washing.

When this dyestuff is used for dyeing anodically oxidizer aluminum and the dyeing is after-treated with aqueous copper sulphate solution (metal sealing) a brownish black of excellent fastness to light is obtained, accompanied by splitting of the sulphuric acid ester and simultaneous formation of the ortho:ortho′-dihydroxyazo-copper complexes.

When the dyeings obtained on pre-chromed silk, wool and viscose rayon are after-coppered—accompanied by splitting of the sulphuric acid ester and by simultaneous formation of the ortho:ortho′-dihydroxyazo-copper complexes—grey to black dyeings are obtained which are fast to washing, and some of them are also very fast to light. When pre-chromed nylon is dyed in the same manner, a brown dyeing results which is shifted to black when subjected to an alkaline treatment in an aqueous medium at an elevated temperature (alkaline washing). The dyeing is distinguished by very good fastness to wetting and light.

When 12.6 parts of the ester dyestuff (molecular weight 630) prepared as described in the first paragraph of this example are dissolved at 60–80° C. in 400 parts of aqueous chromium acetate solution containing 3.5 parts of chromium and the solution is stirred for some time, the readily soluble ortho-hydroxy-carboxy dichromium complex of the ester dyestuff is obtained without splitting of the sulphuric acid ester. This dichromium complex can be isolated in the form of a brown violet powder by evaporation in vacuo at 40–50° C.

The aqueous solution of the ortho-hydroxy-carboxy dichromium complex can be used as it is for dyeing silk, wool, viscose rayon, nylon and anodically oxidized aluminium. After-coppering produces the same tints as mentioned above.

Further valuable disazo dyestuffs can be made in a similar manner, thus for example:

| Example No. | Component | Tint of coppered dyeing in chrome printing on cotton |
|---|---|---|
| 19 | 1:8 - dihydroxynaphthalene - 3: 6- disulphonic acid. | blue-violet. |
| 20 | 5: 5′- dihydroxydinaphthyl - (2: 2′)- amino-disulphonic acid-(7: 7′). | violet. |
| 21 | 8 - acetoacetylamino - 1 - hydroxynaphthalene-3:6-disulphonic acid. | violetish brown. |

EXAMPLE 22

46.8 parts of the monoazo dyestuff, obtained in the known manner from diazotized 4-nitro-1-aminobenzene (molecular weight 468) by coupling with 1-amino-8-hydroxynaphthalene-3:6-disulphonic acid in an acid medium, are dissolved in 500 parts of water, 50 parts of pyridine and 60 parts by volume of aqueous sodium hydroxide solution of 30% strength. The solution is treated with 24.9 parts of the sulphuric acid mono-(5-hydroxy - 4 - carboxy - 2 - aminophenyl) ester (molecular weight 249) diazotized as described in Example 1, and the whole is stirred to complete the coupling. The dyestuff is then isolated in the usual manner and purified by being recrystallized from dilute sodium chloride solution; in the form of its free acid it corresponds to the structural formula

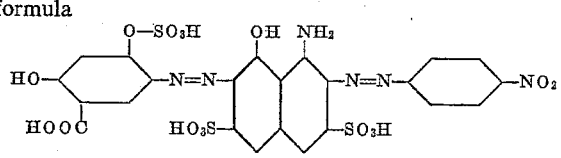

In chrome printing on cotton the after-coppered dyeing displays navy blue tints of very good fastness to light.

EXAMPLE 23

24.9 parts of sulphuric acid mono-(5-hydroxy-4-carboxy-2-aminophenyl) ester (molecular weight 249) are diazotized as described in Example 1 and coupled with 29.4 parts of the monoazo dyestuff obtained by alkaline coupling of diazotized 4-aminobenzene-1-sulphonic acid with 1:3-dihydroxybenzene.

Isolation and drying of the resulting disazo dyestuff yields a dark-brown powder which dissolves in water with brown coloration and in concentrated sulphuric acid with violet-brown coloration.

In chrome printing on cotton after-coppering—accompanied by the splitting of the sulphuric acid ester and by simultaneous formation of the ortho:ortho'-dihydroxyazo-copper complex—yields brown tints of very good fastness to light.

EXAMPLE 24

24.9 parts of sulphuric acid mono-(5-hydroxy-4-carboxy-2-aminophenyl) ester (molecular weight 249) are diazotized as described in Example 1 and coupled with 66.7 parts of the disazo dyestuff prepared by coupling diazotized 4-hydroxy-3-carboxy-3'-amino-1:1'-azobenzene-4-sulphonic acid with 1-amino-8-naphthol-4:6-disulphonic acid in a weakly acid medium.

The trisazo dyestuff obtained in this manner is purified by being precipitated at pH=7 to 8 with sodium chloride, filtered and recrystallized from dilute sodium chloride solution.

The dyestuff, dried in vacuo, corresponds in the form of its free acid to the structural formula

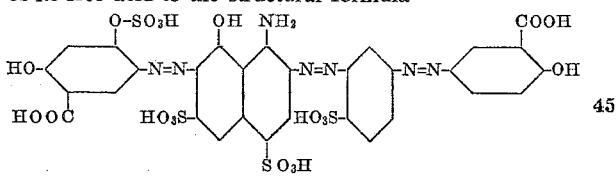

and forms a greyish black powder which dissolves in water with blue coloration and in concentrated sulphuric acid with green coloration.

In chrome printing on cotton a dark-green dyeing is obtained which gives a neutral grey tint of very good fastness to light when after-coppered, accompanied by splitting of the sulphuric acid ester and simultaneous formation of the ortho:ortho'-dihydroxyazo-copper complex.

What I claim is:

1. An azo dyestuff selected from the group consisting of azo dyestuffs of the formula

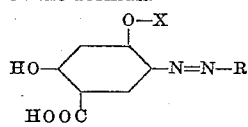

and the copper, cobalt and chromium complex compounds thereof, wherein X is a member selected from the group consisting of H and SO$_3$H, and R is the radical of a coupling component containing an —OH group in a position vicinal to the carbon atom coupled to the azo bridge of the diazo component

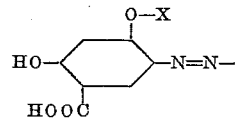

said coupling component being selected from the group consisting of coupling components of the acetoacetarylide, pyrazolone, benzene, naphthalene, benzene-azo-benzene, benzene-azo-naphthalene and benzene-azo-benzene-azo-naphthalene coupling components.

2. An azo dyestuff of the formula

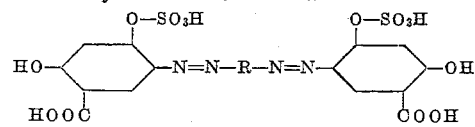

wherein R is the radical of a coupling component of the benzene series which contains an —OH group in a position vicinal to the carbon atom coupled to the azo bridge of the diazo component.

3. An azo dyestuff of the formula

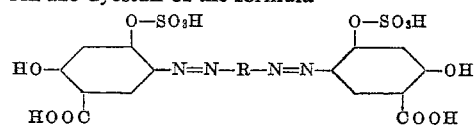

wherein R is the radical of a coupling component of the naphthalene series which contains an —OH group in a position vicinal to the carbon atom coupled to the azo bridge of the diazo component.

4. The azo-dyestuff which possesses in form of the free acid the formula

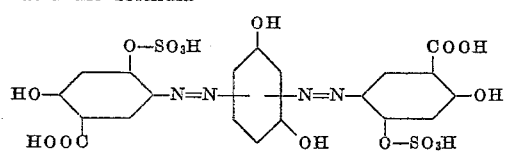

5. The azo-dyestuff which possesses in form of the free acid the formula

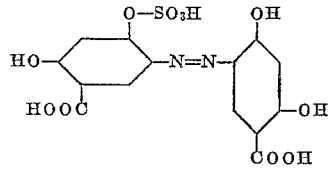

6. The azo-dyestuff which possesses in form of the free acid the formula

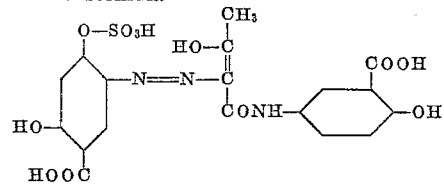

7. The azo-dyestuff which possesses in form of the free acid the formula

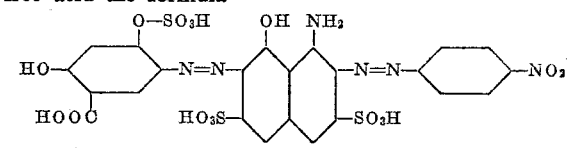

8. The azo-dyestuff which possesses in form of the free acid the formula

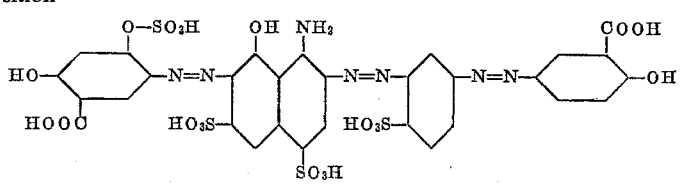

(References on following page)

References Cited in the file of this patent

UNITED STATES PATENTS

| | | |
|---|---|---|
| 1,775,605 | Schweitzer | Sept. 9, 1930 |
| 2,049,286 | Black | July 28, 1936 |
| 2,050,811 | Schuloff | Aug. 11, 1936 |
| 2,753,336 | Maderni | July 3, 1956 |

FOREIGN PATENTS

| | | |
|---|---|---|
| 528,607 | Germany | July 1, 1931 |

OTHER REFERENCES

Orndorff et al.: "American Chemical Journal," volume 44, No. 1, July 1910, pages 1–2. (Copy in Scientific Library.)